United States Patent
Swerdlow et al.

(10) Patent No.: US 8,856,232 B1
(45) Date of Patent: Oct. 7, 2014

(54) SOCIAL NETWORK AUTOMATION

(75) Inventors: Andrew Swerdlow, Mountain View, CA (US); Dan Fredinburg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 13/545,453

(22) Filed: Jul. 10, 2012

(51) Int. Cl.
*G06F 15/16* (2006.01)

(52) U.S. Cl.
USPC .......................................... 709/204; 709/206

(58) Field of Classification Search
CPC ............................... H04L 67/22; G06Q 50/01
USPC ......... 709/203, 204, 206, 217, 219, 224, 226, 709/228; 705/14.52, 14.58, 14.66, 319; 707/748
See application file for complete search history.

(56) References Cited

U.S. PATENT DOCUMENTS

| | | | | |
|---|---|---|---|---|
| 8,374,972 B2* | 2/2013 | Caland | .......................... | 705/319 |
| 2010/0121857 A1* | 5/2010 | Elmore et al. | ................ | 707/748 |
| 2012/0143686 A1* | 6/2012 | Caland | ........................ | 705/14.52 |
| 2012/0278164 A1* | 11/2012 | Spivack et al. | ............. | 705/14.58 |
| 2012/0323704 A1* | 12/2012 | Steelberg et al. | ............. | 709/204 |
| 2013/0151345 A1* | 6/2013 | Brelig | ........................ | 705/14.66 |
| 2013/0282839 A1* | 10/2013 | Alcala | ........................... | 709/206 |

OTHER PUBLICATIONS

Skinner, Carrie-Ann; "How to Set an 'Out of Office' in Gmail, Let senders know you're without email access" May 31, 2011; 3 pages; http://www.pcadvisor.co.uk/how-to/internet/3283048/how-to-set-an-out-of-office-in-gmail/.

* cited by examiner

*Primary Examiner* — Quang N Nguyen (57) ABSTRACT

Methods and systems for social network automation are disclosed. A system can generate a user interface that permits a user to provide criteria for posting particular content to the social network at a first time. The system can receive from the user one or more criteria for posting the particular content to the social network. The system can determine at a second time, after the first time, that a condition satisfying the one or more criteria has occurred. The system can post the particular content to the social network and attribute the post to the user.

17 Claims, 5 Drawing Sheets

SOCIAL NETWORK AUTOMATION

FIELD

Embodiments relate generally to social networks, and, more particularly, to automating the posting of particular content to a social network.

BACKGROUND

Social network systems often permit users to post content, and to repost or respond to content posted by other users in the social network system. It may be beneficial or desirable for a user (or member) of the social network system to maintain an active presence in the social network system by regularly posting content and/or responding to content posted by other users (or members). A user may have a desire or need to post content to the social network system when the user is not logged into the social network system or is offline (e.g., without access to a computer or the Internet, on vacation, or otherwise unable to access the social network system).

SUMMARY

One embodiment can include a computer-implemented method for social network automation. The method can include providing for display to a user, using one or more computing devices, a user interface to permit the user to provide criteria for posting particular content to the social network at a first time. The method can also include receiving, using the one or more computing devices, from the user one or more criteria for posting the particular content to the social network.

The method can further include determining at a second time, after the first time, using the one or more computing devices, that a condition satisfying the one or more criteria has occurred. Based at least in part on the determination that the condition satisfying the one or more criteria has occurred, and independent of additional input from the user, the one or more computing devices can post the particular content to the social network and attribute the posting to the user.

The method can also include receiving particular content from the user that is static and provided before the second time. In another embodiment, the particular content can be dynamic and at least partially automatically generated based on information obtained from an external system.

The one or more criteria can include a date and time for posting the particular content. The particular content can be sent to one or more selected groups of users of the social network. Also, the particular content can include a plurality of content items and the one or more criteria can include a date and time for the posting of each content item of the plurality of content items.

In an embodiment, the particular content can be posted according to a date and time included in the one or more criteria unless an indication is received to terminate the automatic posting. The particular content can be a response to another content item posted in the social network or a repost of another content item posted in the social network. Reposting can be based, in part, on whether the other content item includes a positive sentiment.

In another embodiment, the particular content is a repost of another content item posted in the social network and the one or more criteria include a rule for reposting the other content item.

In one embodiment, the particular content is a repost of another content item posted in the social network, and the posting includes reposting the other content item, the one or more criteria include a rule for reposting the other content item, and the rule includes a number of times the other content item must be recommended before being reposted.

Another embodiment can include a system for social network automation having a processor coupled to a computer readable storage medium bearing software instructions that, when executed by the processor, cause the processor to perform operations. The operations can include providing a user interface for display to a user to permit the user to provide criteria for posting particular content to the social network at a first time, and receiving from the user one or more criteria for posting the particular content to the social network. The operations can also include determining at a second time, after the first time, that a condition satisfying the one or more criteria has occurred.

Based at least in part on the determination that the condition satisfying the one or more criteria has occurred, and independent of additional input from the user, the system can post the particular content to the social network, where the posting of the particular content is attributed to the user. The particular content can be dynamic and at least partially automatically generated based on information obtained from an external system.

The particular content can be a repost of another content item posted in the social network system determined to include a positive sentiment. Also, the one or more criteria can include a rule for reposting the other content item. The rule can include a number of times the other content item must be recommended before being reposted.

One embodiment can include a nontransitory computer readable medium having stored thereon software instructions for social network automation. The software instructions can be executed by a processor to cause the processor to perform operations. The operations can include providing for display to a user a user interface to permit the user to provide criteria for posting particular content to the social network at a first time.

The operations can also include receiving from the user one or more criteria for posting the particular content to the social network. The operations can further include determining at a second time, after the first time, that a condition satisfying the one or more criteria has occurred.

The operations can also include, based at least in part on the determination that the condition satisfying the one or more criteria has occurred, and independent of additional input from the user, posting the particular content to the social network and attributing the posting of the particular content to the user.

The particular content can be a repost of another content item posted in the social network and the one or more criteria can include a rule for reposting the other content item.

DETAILED DESCRIPTION

A method for social network automation is disclosed. The method can include automatically posting (or reposting) content and automatically responding to posts or other content. The automatic posting or responding can be based on one or more criteria received via a user interface. The automatic posting activity can be attributed to a member of the social network and therefore can help the member maintain a presence in the social network even when the member may not be able to manually post content or respond to posts in the social network.

In one embodiment, the method can include providing, from a computer system, a user interface adapted to permit a member of a social network to provide one or more criteria for automatically posting content to the social network. The system can receive the one or more criteria.

When the system determines that a condition satisfying the one or more criteria has occurred, the system can automatically post the content to the social network and attribute the post to the member. For example, a social network member that is going to be away from a computer on the day of a friend's birthday could automate the posting of a happy birthday message to be sent to the friend on the friend's birthday. The content can be posted to one or more groups of members of the social network (e.g., to groups of members associated with the member, such as friends, colleagues, and the like).

The content being posted can be predetermined, such as the happy birthday message example above, and the one or more groups of members can include members of the social network selected by the member. In another embodiment, the content can be partially or fully automatically generated based on information obtained from an external system (e.g., the system could automatically generate a post commenting on the weather, where the post has been automatically generated based on current weather information received from another system). The content can include a single content item or a plurality of content items.

The criteria can include a date and time for automatically posting the content. When the content includes multiple content items, the criteria can include a date and time for posting each content item. The time for automatically posting content can be varied slightly (e.g., making a post at 9:03 am instead of 9:00 am) to make the posting appear to have been done manually.

The automatic posting can be used to post a farewell message unless the automatic posting is terminated. For example, a social network member embarking on a dangerous trip may leave a farewell message that will automatically post unless cancelled by the member when the member returns safely.

In another embodiment, the automatically posted content can include a response to another content item posted in the social network. For example, the system can automatically respond to posts that mention a member (or other named entity), photos the member is tagged in, and comments directed to the member.

Automatically responding can include reposting a content item. The content item may be reposted when a sentiment analysis system determines that the content item contains positive sentiment about the member or other item of interest. For example, a car manufacturer could repost content that mentions one of the manufacturer's vehicles and has a positive sentiment.

Automatically reposting can also be based on one or more rules, such as reposting a particular content item after having received a threshold number of recommendations regarding a particular content item from other members in the social network. It will be appreciated that one or more features from any of the various embodiments described herein can be used together in an embodiment.

Figure 1:
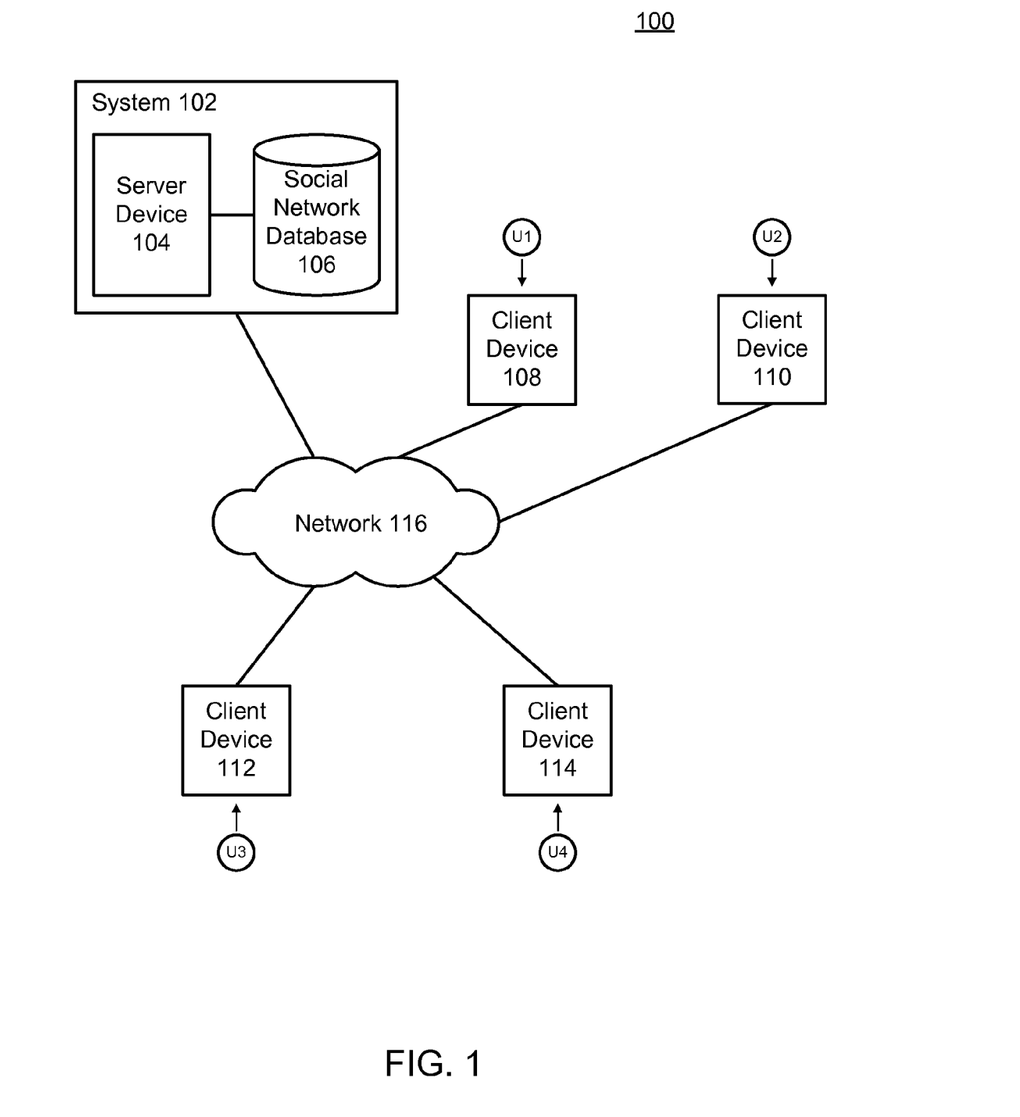
FIG. 1 is a diagram of an example social network system in accordance with at least one embodiment.

As shown in FIG. 1, a social network environment 100 includes a social network system 102 having a server device 104 and a social network database 106. One or more client devices (108-114) can access the social network system 102 via a network 116.

The client devices (108-114) can include, but are not limited to, a desktop computer, a laptop computer, a portable computer, a tablet computing device, a smartphone, a feature phone, a personal digital assistant, a media player, an electronic book reader, an entertainment system of a vehicle or the like. The network 116 can be a wired or wireless network, and can include, but is not limited to, a WiFi network, a local area network, a wide area network, the Internet, or a combination of the above.

In operation, a plurality of users (U1-U4) can access the social network system 102 via respective client devices (108-114). The users can post (or publish) content (e.g., text, images, video, sound clips or the like) to the social network system 102. The content can be stored in the social network database 106.

The social network system 102 can also permit the users to comment on content posted to the social network system. For example, users can tag images (e.g., associate a word or phrase with an image). A tag can include a name of, and link to, a member or other named entity within the social network (e.g., the member who uploaded the photo, other members of the social network, a product name, a company name, an event, a location or the like). A user tagged in a post can receive a notification from the social network system and can respond to being tagged.

Also, a user can repost content that has been posted by another user of the social network system. For example, a user may be a member of multiple groups within the social network and may receive a notification of content posted from one group and can repost that content to a different group within the social network. A company or other organizational member of the social network may wish to selectively repost content that mentions the company or organization. A company may wish to repost only those content items that contain a positive sentiment about the company's products or services.

An embodiment can include a system for automating social network activities including, but not limited to posting content, one or more of responding to posted content, reposting content, responding to being tagged and responding to being recommended. The automated activities can be carried out by the system according to criteria entered by a social network user via a user interface provided by the system.

The system can provide members of the social network with one or more user interfaces to input criteria for automating social network activities. For example, a member may wish to upload content items in advance and have them posted according to specific criteria such as date and time. A user interface can accept the content items and the criteria, and the system can monitor for a condition satisfying the criteria to occur and automatically post the content. The content can be automatically posted from the member's account in the social network and attributed to the member.

Also, the system can automate a response to, or reposting of, content that mentions the member or meets other criteria.

For example, the member can establish a default reply or response to occur whenever the member is tagged or mentioned in a post. The system can also automatically recommend (e.g., vote for or indicate approval of) posts that mention the member.

Figure 2:
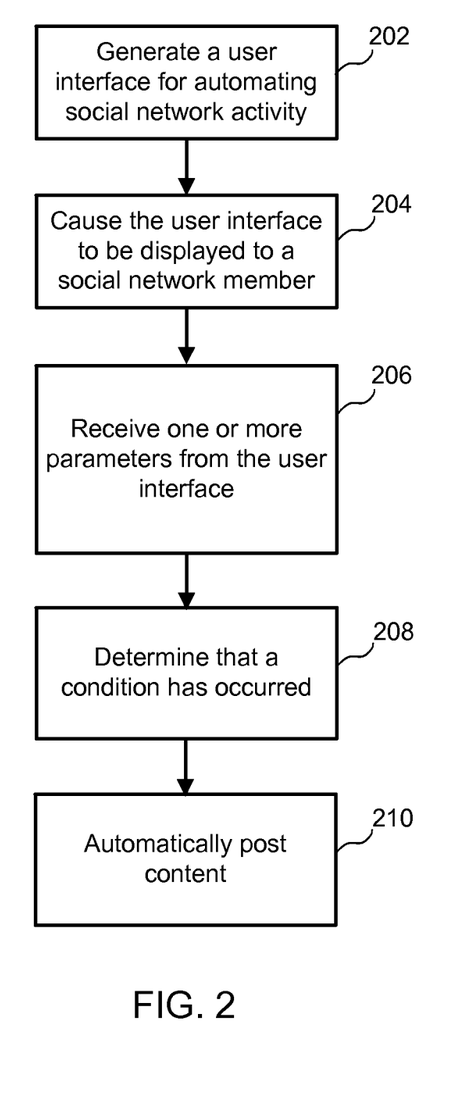
FIG. 2 is a flow chart of an example method for automatically posting content to a social network system based on criteria from a user in accordance with at least one embodiment.

FIG. 2 shows an example method for automating social network activities. Processing begins at 202 where the system generates a user interface for automating social network activity. The user interface can be used to receive criteria for posting or reposting content. The user interface can be generated by the server device 104 of the social network system 102 shown in FIG. 1. Examples of user interfaces are described below with respect to FIGS. 3 and 4. Processing continues to 204.

At 204, the system causes the user interface to be displayed. The system can adapt the user interface for display according to the capabilities or limitations of the client device. For example, a user (e.g., U1 in FIG. 1) may wish to automatically repost content that mentions the user and includes a positive sentiment. The system 102 may cause the content posting automation user interface to be displayed on the client device 108 of the user U1. The client devices (108-114) could be a heterogeneous group of devices including desktop computers, laptop computers, smart phones or other wireless devices. The system 102 can provide the user interface to the client device 108 of the user U1 according to the specific type of the client device 108. Processing continues to 206.

At 206, the system receives criteria for automating social network activities. The criteria can include parameters such as date, time, post content and the like. The criteria can also include decision logic, or values used in decision logic, to determine when and how to post content. For example, the user U1 could input to the user interface an action to take (e.g., repost) and criteria for performing the action such as determining the user's social network ID was mentioned in a post and that the post contains a positive sentiment about the user. The client device 108 can transmit the information received in the user interface to the system 102 where it can be processed by the server 104 and stored in the social network database 106. Processing continues to 208.

At 208, the system determines that a condition satisfying the criteria for posting the content has occurred. For example, the system 102 can monitor criteria stored in the social network database 106 and determine when criteria have been met. The system 102 can determine that the criteria for reposting the content related to the user U1 have been met, i.e., a post mentions the user's social network ID and the post contains positive sentiment. Processing continues to 210.

At 210, the system posts the content, which can be attributed to the user. Continuing with the above example, the server device 104 can repost the content that matches the user's U1 criteria and attribute that repost to the user U1. The reposted content (or a reference to the reposted content) can be stored in the social network database 106. It will be appreciated that 202-210 can be repeated in whole or in part in order to accomplish a contemplated social network automation task.

Figure 3:
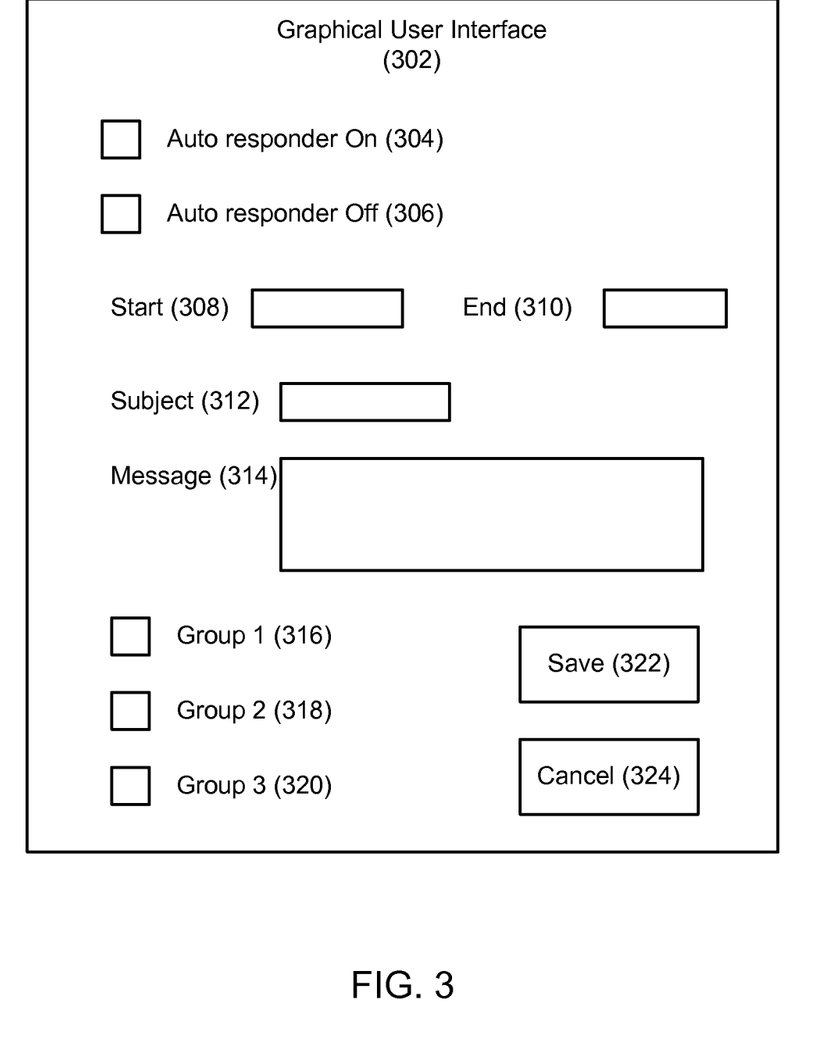
FIG. 3 is an example graphical user interface for receiving automatic content posting criteria in accordance with at least one embodiment.

FIG. 3 is an example graphical user interface (GUI) 302 having elements for turning an auto response on and off (304 and 306), elements for inputting a start and end time (308 and 310), a "Subject" element 312, a message element 314 and elements for selecting one or more groups (316-320). The GUI 302 also includes a "Save" control 322 and a "Cancel" control 324, which can be buttons, for example.

In operation, a system can cause the GUI 302 to be displayed and the GUI 302 can accept user input for social network automation criteria. For example, the user can turn auto responding on or off via elements 304 and 306. Optionally, a start date/time and an end date/time can be input via elements 308 and 310.

The user can enter auto response content via the subject element 312 and the message element 314. The content can include one or more of text, image, video and audio content. In addition to, or as an alternative to, responding with a message, the user interface can include elements for allowing the user to specify another action as the auto response action. For example, an element can allow the user to recommend any posted content or tag that mentions the user's social network member name. Also, the user interface 302 can include elements for permitting the user to select to repost content, respond to direct messages sent via the social network system and respond to instant messages or other chat messages sent via the social network system.

The auto response posts can be sent to all of the members linked to the user or to selected groups of members. The group selection control elements (316-320) can be used to select one or more groups of social network members to which the auto response posts are sent to.

The user can save the auto response criteria settings using the save element 322 or cancel the criteria settings using the cancel element 324.

Figure 4:
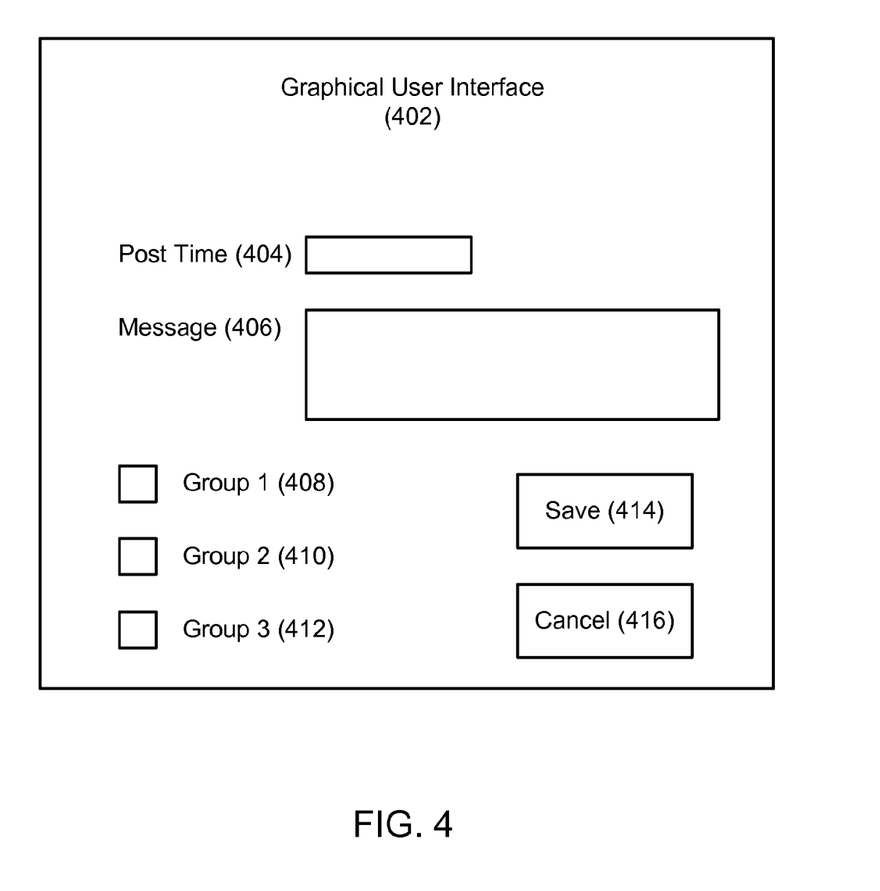
FIG. 4 is an example graphical user interface for receiving automatic content posting criteria in accordance with at least one embodiment.

FIG. 4 shows an example graphical user interface 402 for automated posting to a social network. The graphical user interface 402 can include a post time element 404, a message element 406, group selection elements (408-412), a "Save" element 414 and a "Cancel" element 416.

In operation, a social network system having automation features can cause the user interface 402 to be displayed to a user. The user interface 402 can receive criteria for automated posting. The criteria can include date and time for posting input via the post time element 404, a message 406, and one or more groups entered via group selection elements (408-412). The message 406 can include one or more of text, image, video and audio content.

The particular type and arrangement of user interface elements shown in FIG. 4 are for illustration purposes. Other user interface elements or arrangements can include elements for entering criteria for reposting content (e.g., criteria for reposting when a content item receives a certain amount of recommendations, when a content item is the most popular item at a given time, or the like). Also, user interface elements can permit a user to select a fully or partially machine generated post that can be based on content received by the social network system. For example, a machine generated post can posted and attributed to a member of the social network, and the post can be based on weather information for a particular location received when the post is generated such that the post appears to be a current observation or comment of that member.

User elements can include elements for setting criteria for reposting or recommending content, such as reposting or recommending content that mentions a member or other named entity (e.g., a member name, a brand name, or a product or service name) and contains a positive sentiment. Content sentiment can be determined by a sentiment analysis system and provided to the social network automation system for use in evaluating automation criteria.

The automated content posting can also be configured to deliver a farewell or eulogy message from a user. For example, if a user is embarking on a dangerous trip, the user could prepare a farewell message in advance and input it into the social network automation system for posting at a given time in the future. If the user does not return from the trip, the system can deliver the farewell message by posting the farewell message to the user's main page in the social network or delivering the message to selected members or groups of members. If the user returns safely from the trip, the user can cancel the farewell message post via a user interface (or user interface element) for deleting a social automation task.

Figure 5:
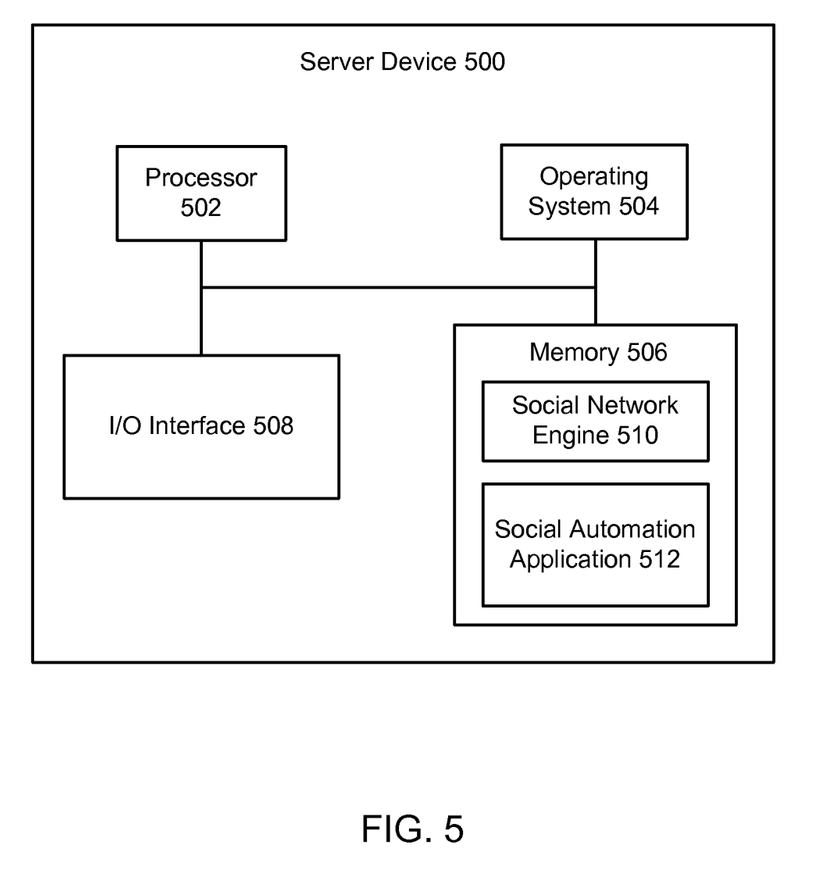
FIG. 5 is a diagram of an example server system in accordance with at least one embodiment.

FIG. 5 is a diagram of an example server device 500 that can be used for automation in a social network system in accordance with at least one embodiment. The server device 500 includes a processor 502, operating system 504, memory 506 and I/O interface 508. The memory 506 can include a social network engine 510 and an application program for social network automation 512.

In operation, the processor 502 may execute the application 512 stored in the memory 506. The application 512 can include software instructions that, when executed by the processor, cause the processor to perform social network automation operations in accordance with the present disclosure (e.g., performing one or more of steps 202-210 described above).

The application program 512 can operate in conjunction with the social network engine 510 and the operating system 504.

The server (e.g., 104 and/or 500) can include, but is not limited to, a single processor system, a multi-processor system (co-located or distributed), a cloud computing system, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal.

Moreover, embodiments of the disclosed method, system, and computer readable media can be implemented in software executed on a programmed general purpose computer, a special purpose computer, a microprocessor, or the like.

It is, therefore, apparent that there is provided, in accordance with the various embodiments disclosed herein, systems, methods and computer readable media for automating social network activities.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A computer-implemented method for social network automation comprising:
    providing for display to a user, using one or more computing devices, a user interface to permit the user to provide criteria for posting particular content to a social network at a first time;
    receiving, using the one or more computing devices, from the user one or more criteria for posting the particular content to the social network;
    determining at a second time, after the first time, using the one or more computing devices, that a condition satisfying the one or more criteria has occurred; and
    based at least in part on the determination that the condition satisfying the one or more criteria has occurred, independent of additional input from the user, and using the one or more computing devices, providing the particular content for posting to the social network, wherein the posting of the particular content is attributed to the user;
    wherein the particular content is a repost of another content item posted in the social network,
    wherein the posting includes reposting the other content item, wherein the one or more criteria include a rule for reposting the other content item, and
    wherein the rule includes a number of times the other content item must be recommended before being reposted.

2. The method of claim 1, further comprising receiving the particular content from the user, wherein the particular content is static and provided before the second time.

3. The method of claim 1, further comprising receiving the particular content from the user, wherein the particular content is dynamic and at least partially automatically generated based on information obtained from an external system.

4. The method of claim 1, wherein the one or more criteria include a date and time for posting the particular content.

5. The method of claim 1, wherein the particular content is sent to one or more selected groups of users of the social network.

6. The method of claim 1, wherein the particular content includes a plurality of content items, wherein the one or more criteria include a date and time for the posting of each content item of the plurality of content items.

7. The method of claim 1, wherein the particular content is posted according to a date and time included in the one or more criteria unless an indication is received to terminate the automatic posting.

8. The method of claim 1, wherein the particular content is a response to another content item posted in the social network.

9. The method of claim 1, wherein the particular content is a response to another content item posted in the social network and shared with the user.

10. The method of claim 1, wherein the particular content is a repost of another content item posted in the social network.

11. The method of claim 1, wherein the particular content is a repost of another content item posted in the social network determined to include a positive sentiment.

12. The method of claim 1, wherein the particular content is a repost of another content item posted in the social network, and wherein the one or more criteria include a rule for reposting the other content item.

13. A system for social network automation comprising:
    a processor coupled to a computer readable storage medium, the computer readable storage medium having stored therein software instructions that, when executed by the processor, cause the processor to perform operations including:
    providing for display to a user a user interface to permit the user to provide criteria for posting particular content to thea social network at a first time;
    receiving from the user one or more criteria for posting the particular content to the social network;
    determining at a second time, after the first time, that a condition satisfying the one or more criteria has occurred; and
    based at least in part on the determination that the condition satisfying the one or more criteria has occurred, independent of additional input from the user, providing the particular content for posting to the social network, wherein the posting of the particular content is attributed to the user;
    wherein the particular content is a repost of another content item posted in the social network, wherein the posting includes reposting the other content item, wherein the one or more criteria include a rule for reposting the other content item, and wherein the rule includes a number of times the other content item must be recommended before being reposted.

14. The system of claim 13, wherein the operations further comprise receiving the particular content from the user, wherein the particular content is dynamic and at least partially automatically generated based on information obtained from an external system.

15. The system of claim 13, wherein the particular content is a repost of another content item posted in the social network determined to include a positive sentiment.

16. The system of claim 13, wherein the particular content is a repost of another content item posted in the social network, and wherein the one or more criteria include a rule for reposting the other content item.

17. A nontransitory computer readable medium having stored thereon software instructions for social network automation that, when executed by a processor, cause the processor to perform operations comprising:

providing for display to a user a user interface to permit the user to provide criteria for posting particular content to a social network at a first time;

receiving from the user one or more criteria for posting the particular content to the social network;

determining at a second time, after the first time, that a condition satisfying the one or more criteria has occurred; and based at least in part on the determination that the condition satisfying the one or more criteria has occurred, independent of additional input from the user, providing the particular content for posting to the social network, wherein the posting of the particular content is attributed to the user;

wherein the particular content is a repost of another content item posted in the social network, wherein the posting includes repostinq the other content item, wherein the one or more criteria include a rule for repostinq the other content item, and wherein the rule includes a number of times the other content item must be recommended before being reposted.

* * * * *